(12) United States Patent
Katsukura

(10) Patent No.: US 11,994,311 B2
(45) Date of Patent: May 28, 2024

(54) CONTROLLER AND AIR CONDITIONING MANAGEMENT SYSTEM

(71) Applicant: Mitsubishi Electric Corporation, Tokyo (JP)

(72) Inventor: Makoto Katsukura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 323 days.

(21) Appl. No.: 17/606,617

(22) PCT Filed: May 15, 2019

(86) PCT No.: PCT/JP2019/019306
§ 371 (c)(1),
(2) Date: Oct. 26, 2021

(87) PCT Pub. No.: WO2020/230291
PCT Pub. Date: Nov. 19, 2020

(65) Prior Publication Data
US 2022/0221181 A1 Jul. 14, 2022

(51) Int. Cl.
*F24F 11/58* (2018.01)
*F24F 11/52* (2018.01)
(Continued)

(52) U.S. Cl.
CPC .............. *F24F 11/58* (2018.01); *F24F 11/52* (2018.01); *G05B 19/042* (2013.01);
(Continued)

(58) Field of Classification Search
None
See application file for complete search history.

(56) References Cited

U.S. PATENT DOCUMENTS 9,920,944 B2 3/2018 Chromy et al.
11,306,938 B2 * 4/2022 Inoue ....................... F24F 11/54
(Continued)

FOREIGN PATENT DOCUMENTS

JP 2010-109947 A 5/2010

OTHER PUBLICATIONS

Office Action dated Jun. 1, 2023 in connection with counterpart Chinese Patent Application No. 201980096167.3 (and English machine translation).
(Continued)

*Primary Examiner* — Hua Lu
(74) *Attorney, Agent, or Firm* — POSZ LAW GROUP, PLC

(57) ABSTRACT

When first screen customizing information is changed in order to change a first display screen, a local controller sends first setting information indicating a changed part of the first screen customizing information to a server. When second screen customizing information is changed in order to change a second display screen, a remote controller sends second setting information indicating a changed part of the second screen customizing information to the server. The server sends first renewal information identical to the second setting information to the local controller and sends second renewal information identical to the first setting information to the remote controller; the local controller changes the first display screen in accordance with the first renewal information; and the remote controller changes the second display screen in accordance with the second renewal information.

9 Claims, 10 Drawing Sheets

(51) Int. Cl.
*G05B 19/042* (2006.01)
*G06F 3/14* (2006.01)
*H04L 9/40* (2022.01)

(52) U.S. Cl.
CPC .......... *G06F 3/1462* (2013.01); *H04L 63/029* (2013.01); *G05B 2219/2614* (2013.01)

(56) References Cited

U.S. PATENT DOCUMENTS

| | | | | |
|---|---|---|---|---|
| 2009/0057424 | A1* | 3/2009 | Sullivan | F24F 11/63 700/83 |
| 2009/0057427 | A1* | 3/2009 | Geadelmann | F24F 11/63 707/999.009 |
| 2015/0053781 | A1* | 2/2015 | Nelson | G05D 23/1902 236/1 C |
| 2015/0276254 | A1* | 10/2015 | Nemcek | G10L 15/22 700/278 |
| 2016/0209060 | A1* | 7/2016 | Castillo | H04L 12/2823 |
| 2016/0211985 | A1* | 7/2016 | Castillo | F24F 11/62 |
| 2016/0232778 | A1* | 8/2016 | Honjo | G08B 19/005 |
| 2016/0273793 | A1* | 9/2016 | Chromy | F24F 11/56 |
| 2017/0112716 | A1* | 4/2017 | Rawls-Meehan | A61H 23/0263 |
| 2018/0023837 | A1* | 1/2018 | Kraft | H04L 41/0846 700/276 |
| 2019/0041080 | A1* | 2/2019 | Higuchi | F24F 11/54 |
| 2020/0116378 | A1* | 4/2020 | Heintzelman | F24F 11/523 |
| 2020/0116533 | A1* | 4/2020 | Read | H04L 67/12 |
| 2020/0119942 | A1* | 4/2020 | Read | H04L 12/2809 |
| 2021/0080141 | A1* | 3/2021 | Tsuboi | F24F 13/20 |
| 2021/0262685 | A1* | 8/2021 | Fukushima | F24F 11/58 |

OTHER PUBLICATIONS

Office Action dated Mar. 21, 2022 in corresponding EP Patent Application No. 19929109.7.
International Search Report of the International Searching Authority dated Jun. 11, 2019 for the corresponding international application No. PCT/JP2019/019306 (and English translation).
Office Action issued Jan. 3, 2024 in connection with counterpart European Patent Application No. 19929109.7.

* cited by examiner

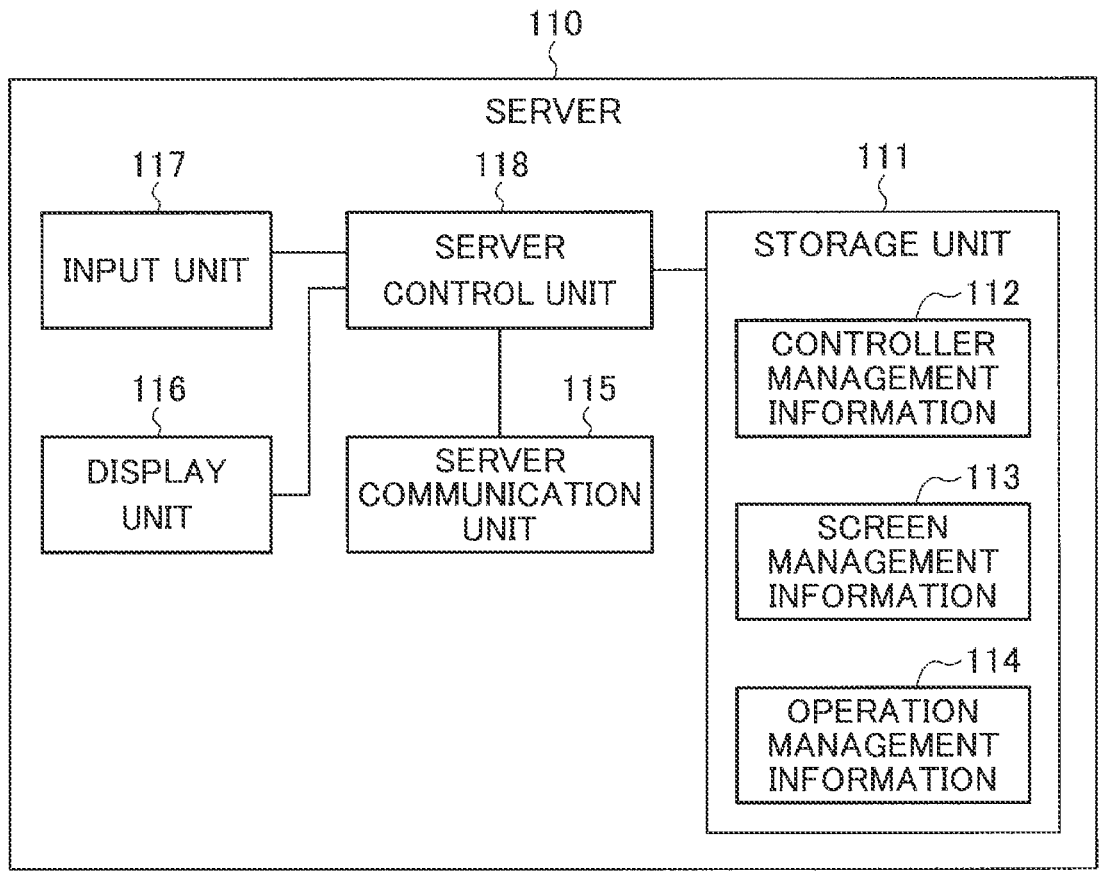

FIG. 4

| ITEM | CONTENT | TIME STAMP |
|---|---|---|
| FLOOR IMAGE | Floor image 001 | 2010/06/06 |
| FLOOR LAYOUT | Floor layout 001 | 2018/03/01 |
| NAME OF AIR CONDITIONER | BRANCH OFFICE MEETING ROOM 1 | 2018/03/01 |
| BUILDING NAME | ABC BUILDING | 2010/06/06 |
| FLOOR NAME | 5F | 2010/06/06 |

FIG. 5

| LOCAL CONTROLLER | OPERATING STATE | TEMPERATURE SETTING | OPERATION MODE |
|---|---|---|---|
| LOCAL CONTROLLER 140A | ON | 25°C | HEATING |
| LOCAL CONTROLLER 140B | OFF | | |
| LOCAL CONTROLLER 140C | ON | 23°C | HEATING |
| LOCAL CONTROLLER 140D | ON | 23°C | HEATING |

FIG. 6A
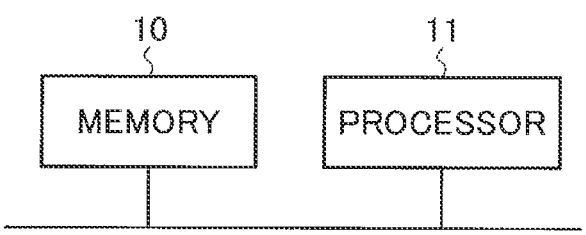

FIG. 6B
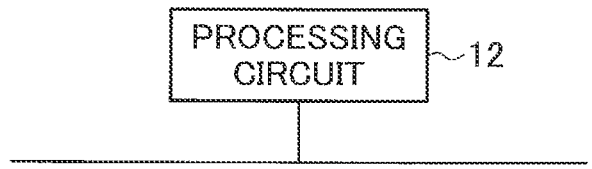

| LOCAL CONTROLLER | OPERATING STATE | TEMPERATURE SETTING | OPERATION MODE |
|---|---|---|---|
| LOCAL CONTROLLER 140A | ON | 25°C | HEATING |
| LOCAL CONTROLLER 140B | OFF | | |

CONTROLLER AND AIR CONDITIONING MANAGEMENT SYSTEM

CROSS REFERENCE TO RELATED APPLICATION

This application is a U.S. national stage application of international Application No. PCT/JP2019/019306, filed on May 15, 2019, the contents of which are incorporated herein by reference.

TECHNICAL FIELD

The present invention relates to a controller and an air conditioning system.

BACKGROUND

With the progress of network technology, it has become common to control air conditioning in the office spaces of branch offices from remote locations such as headquarters. In such a case, a virtual private network (VPN) is constructed between the headquarter and a branch office, and the communication content is encrypted to ensure security.

However, since the construction of a VPN is expensive, a simple method has become popular in which a network barrier, called a firewall, is installed and only communication from each local network to the outside is permitted. In such the case, it is difficult to access the inside of the local network from the outside of that local network, and thus it is necessary to install a server at an intermediate point to relay data.

With such a configuration, it is not easy to equalize the operability of a controller installed near an air conditioner (hereinafter, referred to as a local controller) and the operability of a controller installed at a remote site (hereinafter, referred to as a remote controller). For example, if the screen of the local controller is customized on site, the operability of the local controller will be different from the operability of the remote controller.

For example, when the floor layout is changed in a building in which the local controller is installed, and the information of the floor layout is reflected just in the local controller, the local controller and the remote controller will display different layouts. Since many remote controllers may be installed, it is a difficult task to manually change the display settings of every remote controller one by one.

To cope with this, there is a technique of automatically equalizing the operability, for example, by sharing an image to be used for operation between terminals (refer to, for example, Patent Literature 1).

PATENT REFERENCE

Patent Literature 1: Japanese Patent Application Publication No. 2010-109947

However, in the conventional technique, the image to be used for operation must be exchanged between the controllers, and for a configuration in which data is relayed by a server at an intermediate point, as mentioned above, the delay time of the screen renewal increases, and the operability of the remote controller significantly deteriorates.

SUMMARY

Accordingly, it is an object of at least one aspect of the present invention to readily equalize the operability of a first controller and the operability of a second controller via a server.

A controller according to an aspect of the invention is configured to select and execute one of first air conditioning control and second air conditioning control, the controller including: a connection interface unit configured to be connected to an air conditioner; a communication interface unit configured to perform communication; a display unit configured to display a display screen; and a control unit configured to control the connection interface unit, the communication interface unit, and the display unit; wherein in a case where the first air conditioning control is executed, the connection interface unit is connected to the air conditioner, the communication interface unit is connected to a first network, the control unit is configured to cause the display unit to display a first display screen in accordance with first screen customizing information for generating the first display screen for controlling the air conditioner, and to control the air conditioner by using the first display screen, the control unit, when the first screen customizing information is changed in order to change the first display screen, is configured to send first setting information from the communication interface unit to a server connected to the Internet via a first firewall connected to the first network, the first setting information indicating a changed part of the first screen customizing information, and the control unit is configured to obtain, from the server via the communication interface unit, renewal information indicating a changed part of screen customizing information for generating a remote display screen and to change, by changing the first screen customizing information in accordance with the renewal information, the first display screen so that the first display screen is to be identical to the remote display screen, the remote display screen being a display screen to be displayed in a remote controller not connected to the air conditioner; and in a case where the second air conditioning control is executed, the connection interface unit is not connected to the air conditioner, the communication interface unit is connected to a second network, the control unit is configured to cause the display unit to display a second display screen for controlling the air conditioner in accordance with second screen customizing information for generating the second display screen, the control unit, when the second screen customizing information is changed in order to change the second display screen, is configured to send second setting information indicating a changed part of the second screen customizing information from the communication interface unit to the server connected to the Internet via a second firewall connected to the second network, and the control unit is configured to obtain, from the server via the communication interface unit, renewal information indicating a changed part of screen customizing information for generating a local display screen and to change, by changing the second screen customizing information in accordance with the renewal information, the second display screen so that the second display screen is to be identical to the local display screen, the local display screen being a display screen to be displayed in a local controller connected to the air conditioner.

An air conditioning system according to an aspect of the invention includes: a first controller is configured to control an air conditioner, the first controller being configured to be connected to the air conditioner and a first network and be able to communicate with the Internet via a first firewall connected to the first network; a second controller is configured to control the air conditioner via the first controller, the second controller being configured to be connected to a second network and be able to communicate with the Internet via a second firewall connected to the second network; and a server configured to be connected to the Internet; wherein the first controller includes; a connection interface unit configured to be connected to the air conditioner, a first communication interface unit configured to be connected to the first network, a first display unit configured to display a first display screen based on first screen customizing information, the first screen customizing information being information for generating the first display screen, and a first control unit configured to send, when the first screen customizing information is changed in order to change the first display screen, first setting information indicating a changed part of the first screen customizing, information to the server via the first communication interface unit, the second controller includes; a second communication interface unit configured to be connected to the second network, a second display unit configured to display a second display screen based on second screen customizing information identical to the first screen customizing information, the second screen customizing information being information for generating the second display screen identical to the first display screen, and a second control unit configured to send, when the second screen customizing information is changed in order to change the second display screen, second setting information indicating a changed part of the second screen customizing information to the server via the second communication interface unit, and the server includes; a server communication interface unit configured to be connected to the Internet, and a server control unit configured to send first renewal information identical to the second setting information to the first controller via the server communication interface unit in response to a request from the first controller and to send second renewal information identical to the first setting information to the second controller via the server communication interface unit in response to a request from the second controller, wherein the first control unit is configured to obtain the first renewal information from the server via the first communication interface unit and to change, by changing the first screen customizing information in accordance with the first renewal information, the first display screen so that the first display screen is to be identical to the changed second display screen, and the second control unit is configured to obtain the second renewal information from the server via the second communication interface unit and to change, by changing the second screen customizing information in accordance with the second renewal information, the second display screen so that the second display screen is to be identical to the changed first display screen.

According to at least one aspect of the present invention, it is possible to readily equalize the operability of a first controller and the operability of a second controller via a server.

BRIEF DESCRIPTION OF THE DRAWINGS

FIG. 2 is a block diagram schematically illustrating the configuration of a server.

FIG. 3 is a schematic diagram of controller management information.

FIG. 4 is a schematic diagram illustrating an example of screen customizing management information.

FIG. 5 is a schematic diagram illustrating operation management information.

FIGS. 6A and 6B are block diagrams illustrating hardware configuration examples.

DETAILED DESCRIPTION

Figure 1:
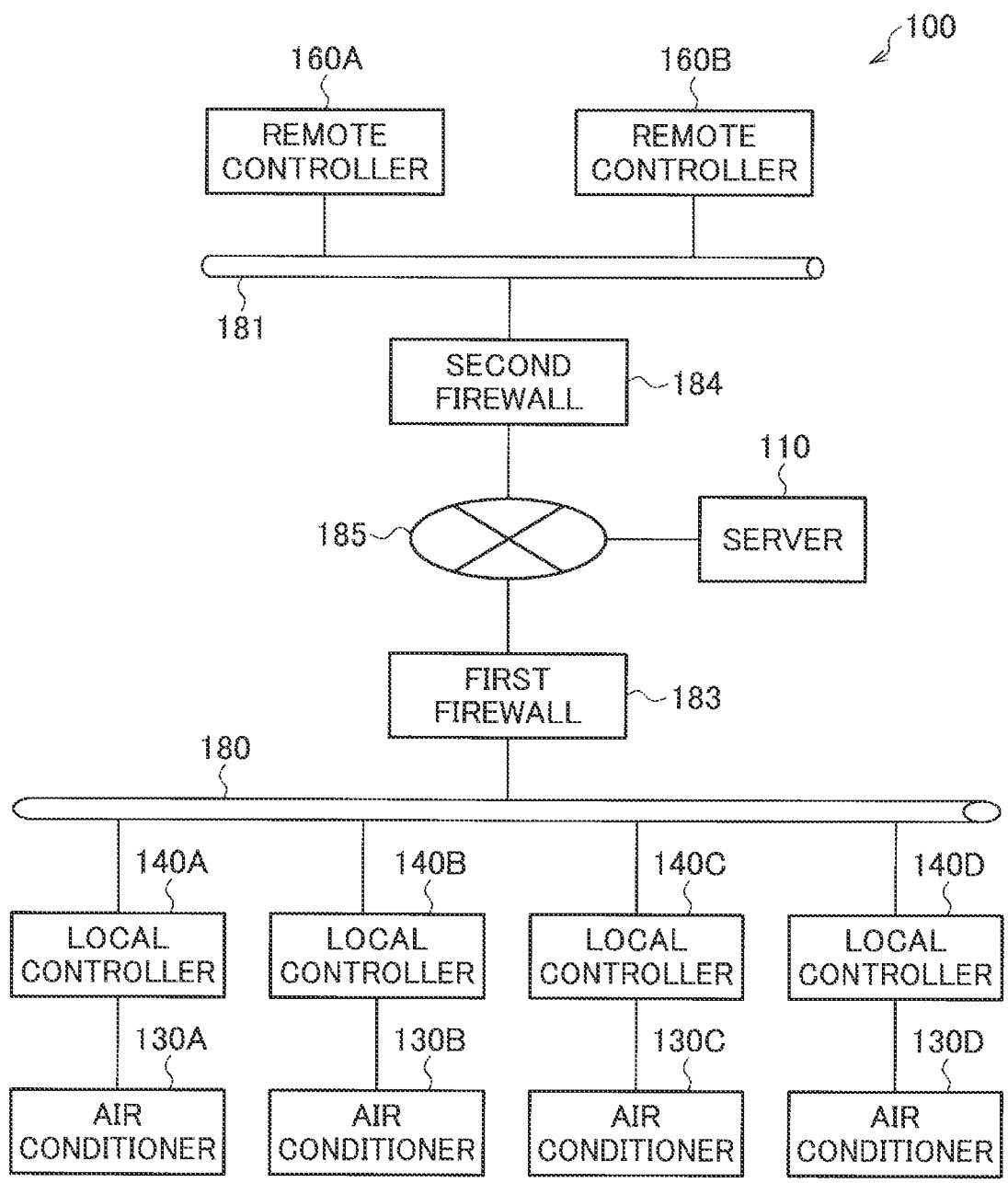
FIG. 1 is a block diagram schematically illustrating the configuration of an air conditioning management system according to an embodiment.

FIG. 1 is a block diagram schematically illustrating the configuration of an air conditioning management system 100 according to an embodiment.

The air conditioning management system 100 includes a server 110, air conditioners 130A to 130D, local controllers 140A to 140D, and remote controllers 160A and 160B, as illustrated in FIG. 1.

The local controllers 140A to 140D are connected to a first local area network (LAN) 180 or first network.

The remote controllers 160A and 160B are connected to a second LAN 181 or second network.

The first LAN 180 is connected to a first firewall 183, and the local controllers 140A to 140D can communicate with the Internet 185 or third network via the first firewall 183.

The second LAN 181 is connected to a second firewall 184, and the remote controllers 160A and 160B can communicate with the Internet 185 via the second firewall 184.

When there is no need to distinguish between the air conditioners 130A to 130D, the air conditioners 130A to 130D are referred to as air conditioners 130. When there is no need to distinguish between the local controllers 140A to 140D, the local controllers 140A to 140D are referred to as local controllers 140. When there is no need to distinguish between the remote controllers 160A and 160B, the remote controllers 160A and 160B are referred to as remote controllers 160.

In the example illustrated in FIG. 1, the air conditioning management system 100 includes four air conditioners 130A to 130D, four local controllers 140A to 140D, and two remote controllers 160A and 160B, but these numbers are not limited to such example. The air conditioning management system 100 should include at least one air conditioner 130, at least one local controller 140, and at least one remote controller 160.

Note that, as described above, the local controllers 140 and the remote controllers 160 are controllers that control the air conditioners 130; the local controllers 140 are connected to air conditioners 130 while the remote controllers 160 are not connected to the air conditioners 130 but control the air conditioners 130 via the local controllers 140.

For example, the air conditioners 130 are installed in the office spaces of branch offices of a company located at multiple sites. The air conditioners 130 are connected to the local controllers 140.

The local controllers 140 control the operating state, such as operation and suspension, and the operation mode, such as heating operation or cooling operation, of the air conditioners 130.

The first firewall 183 transmits a communication request from the first LAN 180 connected to the local controllers 140 to the Internet 185, but does not transmit a communication request from the Internet 185 to the first LAN 180.

The server 110 is connected to the Internet 185. The second firewall 184 transmits a communication request from the second LAN 181 in which the remote controllers 160 are installed, to the Internet 185, but does not transmit a communication request from the Internet 185 to the second LAN 181.

The remote controllers 160 control the air conditioners 130 disposed at remote sites.

Since the air conditioning management system 100 includes the first firewall 183 and the second firewall 184, as described above, it is possible to access the server 110 from the local controllers 140, but it impossible to access the local controllers 140 from the remote controllers 160 and the server 110.

Moreover, it is possible to access the server 110 from the remote controllers 160, but it is impossible to access the remote controllers 160 from the local controllers 140 and the server 110.

Here, the control executed by the local controllers 140 is also referred to as first air conditioning control, and the control executed by the remote controllers 160 is also referred to as second air conditioning control.

FIG. 2 is a block diagram schematically illustrating the configuration of the server 110.

The server 110 includes a storage unit 111 as a server storage unit, a server communication unit 115 as a server communication interface unit, a display unit 116 as a server display unit, an input unit 117 as a server input unit, and a server control unit 118.

The storage unit 111 stores programs and information necessary for processing by the server 110.

For example, the storage unit 111 stores controller management information 112, screen management information 113, and operation management information 114.

The controller management information 112 correlates the local controllers 140 and the remote controllers 160.

FIG. 3 is a schematic diagram of the controller management information 112.

The controller management information 112 is information in a table format containing a local controller column 112a, a remote controller column 112b, and a transmission complete column 112c, as illustrated in FIG.

The local controller column 112a stores local controller identification information for identifying the local controllers 140.

The remote controller column 112b stores remote controller identification information for identifying the remote controllers 160 that remotely control the air conditioners 130 connected to the local controllers 140 identified by the local controller identification information stored in the same row of the local controller column 112a.

The transmission complete column 112c stores information indicating whether or not information corresponding to the screen customizing information from the local controllers 140 is sent to the remote controllers 160. Here, if a check mark is stored in the transmission complete column 112c, the transmission is completed, and if no check mark is stored, the transmission is not completed.

For example, as illustrated in the second and third rows of the controller management information 112 in FIG. 3, if the local controller 140A and the local controller 140B are correlated with the remote controller 160A, the remote controller 160A can switch, for a display, between a display screen that is the same as the display screen of the local controller 140A and a display screen that is the same as the display screen of the local controller 140B, in accordance with a switching instruction from a user. Then, the remote controller 160A can display a display screen that is the same as the display screen of the local controller 140A to remotely control the air conditioner 130A via the local controller 140A, and can display a display screen that is the same as the display screen of the local controller 140B to remotely control the air conditioner 130B via the local controller 140B.

To return to FIG. 2, the screen management information 113 includes, for each local controller 140, screen customizing management information for generating a display screen for controlling the air conditioner 130 connected to the corresponding local controller 140. It is assumed that the screen customizing management information is associated with the local controller identification information of the local controller 140 that displays the corresponding display screen.

FIG. 4 is a schematic diagram illustrating an example of the screen customizing management information. The screen customizing management information 1131 illustrated in FIG. 4 is information in a table format containing an item column 113 #1a, a content column 113 #1b, and a timestamp column 113 #1c.

Note that the screen customizing management information 113 #1 illustrated in FIG. 4 is for generating a display screen of the local controller 140A illustrated in FIG. 1.

The item column 113 #1a stores item names or item identification information for identifying the items displayed on the display screen.

The content column 113 #1b stores the content of the corresponding items. For example, as the content of the item name "floor image," a file name of a file indicating a floor image in a raster format is stored. As the content of the item name "floor layout," a file name of a file of a floor layout image in a vector format for drawing lines indicating the floor layout or an object such as an air conditioner is stored. Note that as the content of the item names "name of air conditioner," "name of building," and "name of floor," text data indicating them is stored.

The timestamp column 113 #1c stores timestamps indicating the times of renewal of the corresponding items. In the first embodiment, a date is used as the timestamp, but any information may be used as long as the information can distinguish between before and after a renewal.

To return to FIG. 2, the operation management information 114 indicates the operating states of the air conditioners 130.

FIG. 5 is a schematic diagram illustrating the operation management information 114.

The operation management information 114 is information in a table format containing a local controller column 114a, an operating state column 114b, a temperature setting column 114c, and an operation mode column 114d, as illustrated in FIG. 5.

The local controller column 114a stores the local controller identification information of the local controllers 140 that have sent operating state information, i.e., the local controllers 140 connected to the corresponding air conditioners 130.

The operating state column 114b stores operating state information indicating whether or not the corresponding air conditioners 130 are in operation. If the operating state information indicates "ON," it indicates operation, and the operating state information indicates "OFF," it indicates suspension.

The temperature setting column 114c stores temperature setting information indicating the temperature setting of the corresponding air conditioners 130. If the operating state is "OFF," the corresponding field in the column is left empty.

The operation mode column 114d stores operation mode information indicating the operation modes of the corresponding air conditioners 130. The operation mode information indicates, for example, an operation mode such as "heating," "cooling," or "dry." If the operating state is "OFF," the corresponding field in the column is left empty.

To return to FIG. 2, the server communication unit 115 is connected to and communicates with the Internet 185.

The display unit 116 displays various screens.

The input unit 117 accepts input from an operator.

The server control unit 118 controls the processing by the server 110.

For example, in response to a request from a correlated local controller 140, the server control unit 118 sends renewal information identical to the setting information sent from the remote controller 160, to the local controller 140 via the server communication unit 115. Here, setting information sent from the remote controller 160 is also referred to as second setting information. The renewal information sent to the local controller 140 is also referred to as first renewal information.

In response to a request from a remote controller 160, the server control unit 118 sends renewal information identical to the setting information sent from a correlated local controller 140 to the remote controller 160 via the server communication unit 115. Here, the setting information sent from the local controller 140 is also referred to as first setting information. The renewal information sent to the remote controller 160 is also referred to as second renewal information.

Specifically, when an operator correlates a local controller 140 and a remote controller 160 by using the input unit 117 via the screen for correlating the local controller 140 and the remote controller 160 displayed on the display unit 116, the server control unit 118 generates controller management information 112 in accordance with the inputted content and causes the storage unit 111 to store the generated controller management information 112.

When setting information is sent from a local controller 140 or a remote controller 160, and when the timestamp included in the setting information is newer than the timestamp of the item corresponding to the item included in the setting information out of the items of the corresponding screen customizing management information included in the screen management information 113, the server control unit 118 renews the content of the corresponding item in the screen customizing information with the content of the item included in the setting information, and also renews the corresponding timestamp with the timestamp included in the setting information.

When a local confirmation request is issued by a remote controller 160, the server control unit 118 refers to the screen management information 113, generates local renewal information indicating the content of the item having a timestamp newer than the timestamp included in the local confirmation request in the screen customizing management information associated with the local controller identification information included in the local confirmation request, and gives the generated local renewal information to the remote controller 160 that had issued the request.

When a remote confirmation request is issued from a local controller 140, the server control unit 118 refers to the screen management information 113, generates remote renewal information indicating the content of the item having a timestamp newer than the timestamp included in the remote confirmation request in the screen customizing management information associated with the local controller identification information included in the remote confirmation request, and gives the generated remote renewal information to the local controller 140 that had issued the request.

When operating state information is sent from the local controller 140, the server control unit 118 renews the corresponding row in the operation management information 114.

Then, when a remote controller 160 issues an operation confirmation request, the server control unit 118 refers to the controller management information 112 to specify a local controller 140 correlated with the remote controller 160 that had issued the request. Moreover, the server control unit 118 refers to the operation management information 114 to specify the operating state of the specified local controller 140, and gives operating state response information indicating the specified operating state of each correlated local controller 140 to the remote controller 160 that had issued the request.

A portion or the entirety of the server control unit 118 described above can be implemented by, for example, a memory 10 and a processor 11, such as a central processing unit (CPU), that executes the programs stored in the memory 10, as illustrated in FIG. 6A. In other words, the server 110 can be implemented by a computer. Such programs may be provided via a network or may be recorded and provided on a recording medium. That is, such programs may be provided as, for example, program products.

A portion or the entirety of the server control unit 118 can be implemented by, for example, a processing circuit 12, such as a single circuit, a composite circuit, a programmed processor, a parallel programmed processor, an application specific integrated circuit (ASIC), or a field programmable gate array (FPGA), as illustrated in FIG. 6B.

Note that the storage unit 111 can be implemented by a storage device, such as a hard disc drive (HDD).

The server communication unit 115 can be implemented by a communication device, such as a network interface card (NIC).

The display unit 116 can be implemented by a display device, such as a display.

The input unit 117 can be implemented by an input device, such as a mouse or a keyboard.

Figures 7, 8:
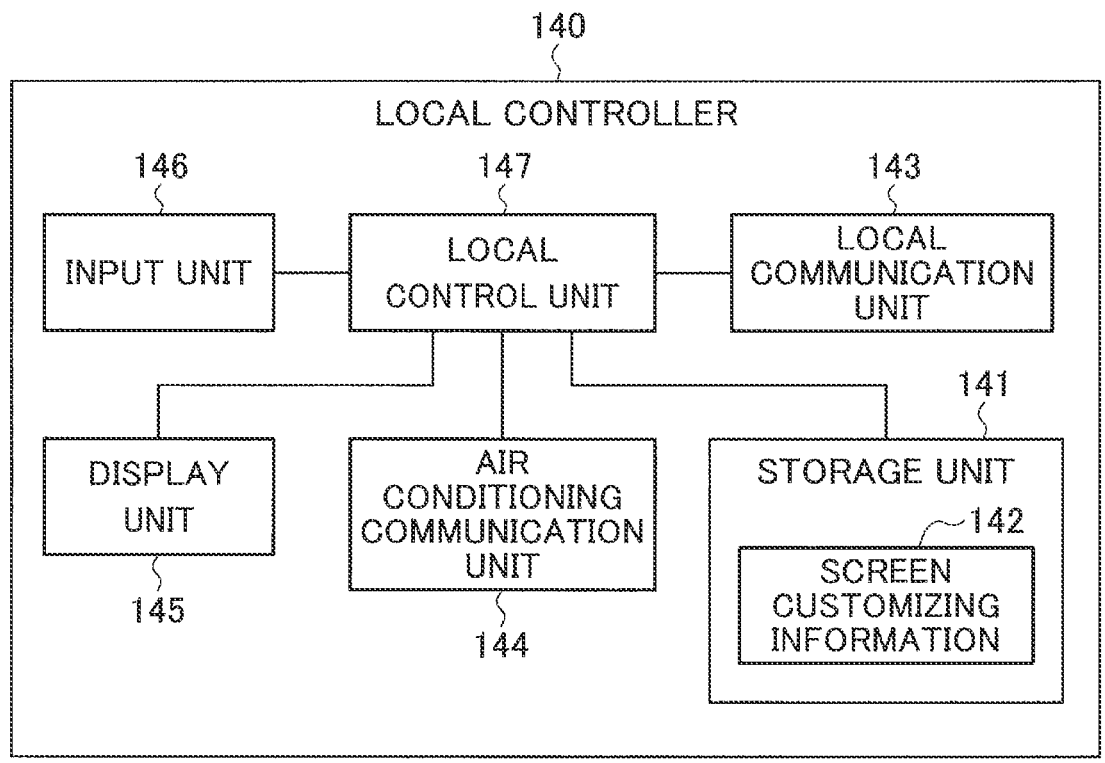
FIG. 7 is a block diagram schematically illustrating the configuration of a local controller.
FIG. 8 is a schematic diagram illustrating an example of screen customizing information.

FIG. 7 is a block diagram schematically illustrating the configuration of the local controller 140.

The local controller 140 is a first controller including a storage unit 141 as a first storage unit, a local communication unit 143 as a first communication interface unit, an air conditioning communication unit 144 as a connection interface unit, a display unit 145 as a first display unit, an input unit 146 as a first input unit, and a local control unit 147 as a first control unit.

The storage unit 141 stores programs and information necessary for processing by the local controller 140.

For example, the storage unit 141 stores screen customizing information 142 or first screen customizing information for generating a first display screen. The screen customizing information 142 is information for generating a display screen for controlling the air conditioner 130 connected to the local controller 140.

FIG. 8 is a schematic diagram illustrating an example of the screen customizing information 142.

The screen customizing information 142 illustrated in FIG. 8 is information in a table format containing an item column 142a, a content column 142b, and a timestamp column 142c.

Note that the screen customizing information 142 illustrated in FIG. 8 is for generating a display screen to be displayed by the local controller 140A illustrated in FIG. 1.

The item column 142a stores item names.

The content column 142b stores the content of corresponding items. Note that, if file names are indicated in the content column 142b, the screen customizing information 142 includes files identified by those file names.

The timestamp column 142c stores timestamps indicating the times at which any of the items have been renewed. In the first embodiment, a date is used as the timestamp, but any information may be used as long as the information can distinguish between before and after the renewal.

To return to FIG. 7, the local communication unit 143 is connected to and communicates with the first LAN 180.

The air conditioning communication unit 144 is connected to and communicates with the air conditioner 130.

The display unit 145 displays a display screen as a first display screen. Note that the display screen displayed by the local controller 140 is also referred to as a local display screen.

The input unit 146 accepts an input of an instruction from a user via a screen displayed on the display unit 145.

The local control unit 147 controls the processing by the local controller 140.

For example, the local control unit 147 causes the display unit 145 to display a display screen on the basis of the screen customizing information 142 stored in the storage unit 141, and controls the air conditioner 130 in accordance with an instruction input to by the input unit 146.

When the input unit 146 accepts an input instructing the setting for changing the display screen via the screen displayed on the display unit 145, the local control unit 147 changes the screen customizing information 142 in response to the input instruction, and renews the timestamp to the time at which the change was made.

If the screen customizing information 142 is changed, the local control unit 147 generates setting information or first setting information including the changed part, a timestamp, and local controller identification information for identifying the local controller 140. The local control unit 147 then causes the local communication unit 143 to send the setting information to the server 110. Here, the changed part includes the item names of the changed items and the content after the change. Note that the content after the change may include changed files.

The local control unit 147 generates, in a predetermined cycle, remote confirmation requests, which are requests for confirming whether or not the display screen of the correlated remote controller 160 has been changed. A remote confirmation request includes a timestamp included in the screen customizing information 142 and local controller identification information for identifying the local controller 140. The predetermined cycle is preferably from one minute to one hour. The local control unit 147 then causes the local communication unit 143 to send the remote confirmation request to the server 110.

Then, when the local communication unit 143 receives remote renewal information or renewal information from the server 110 as a response to the remote confirmation request, the local control unit 147 changes the screen customizing information 142 stored in the storage unit 141 on the basis of the received remote renewal information and changes the display screen displayed on the display unit 145. Consequently, when the display screen of a correlated remote controller 160 is changed, the display screen displayed on the local controller 140 is also changed to be identical to the display screen changed in the remote controller 160.

Furthermore, when the operating state of the air conditioner 130 changes, the local control unit 147 generates operating state information indicating the operating state after the change and the local controller identification information. The local control unit 147 then causes the local communication unit 143 to send the operating state information to the server 110.

A portion or the entirety of the local control unit 147 described above can be implemented by, for example, a memory 10 and a processor 11, as illustrated in FIG. 6A. Such programs may be provided via a network or may be recorded and provided on a recording medium. That is, such programs may be provided as, for example, program products.

A portion or the entirety of the local control unit 147 can also be implemented by, for example, a processing circuit 12, as illustrated in FIG. 6B.

Note that the storage unit 141 can be implemented by, for example, a non-volatile memory.

The local communication unit 143 can be implemented by a communication device such as an NIC.

The air conditioning communication unit 144 can be implemented by a connection interface for connecting to the air conditioner 130.

The display unit 145 and the input unit 146 can be implemented by, for example, a touch screen.

Figures 9, 10:
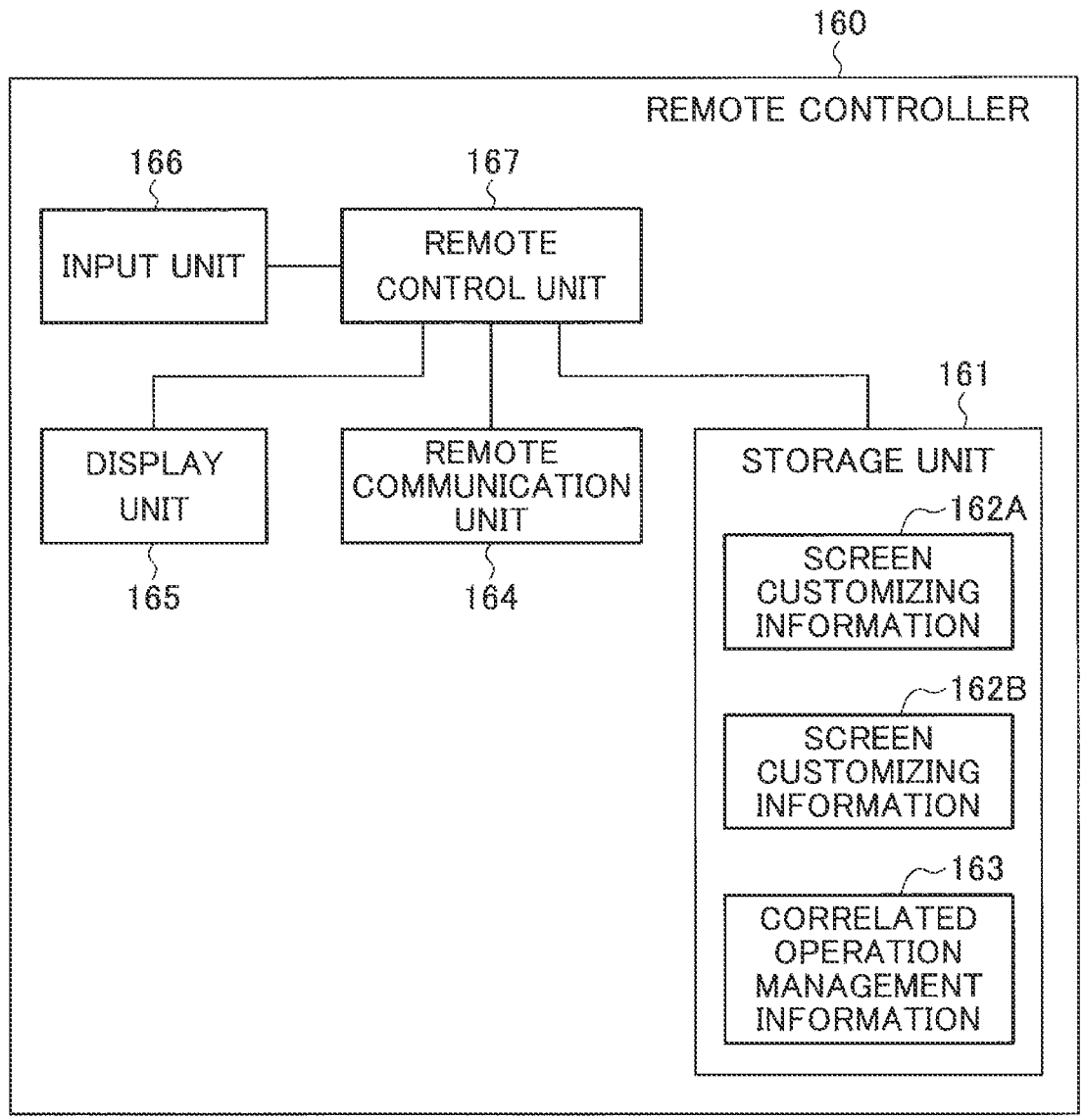
FIG. 9 is a block diagram schematically illustrating the configuration of a remote controller.
FIG. 10 is a schematic diagram illustrating an example of correlated operation management information.

FIG. 9 is a block diagram schematically illustrating the configuration of a remote controller 160.

The remote controller 160 is a second controller including a storage unit 161 as a second storage unit, a remote communication unit 164 as a second communication interface unit, a display unit 165 as a second display unit, an input unit 166 as a second input unit, and a remote control unit 167 as a second control unit.

The storage unit 161 stores programs and information necessary for processing by the remote controller 160. Here, the remote controller 160 is assumed to be the remote controller 160A illustrated in FIG. 1. Note that the remote controller 160B has the same configuration as that of the remote controller 160A except for the information stored in the storage unit 161.

For example, the storage unit 161 stores screen customizing information 162A, screen customizing information 162B, and correlated operation management information 163. The screen customizing information 162A and the screen customizing information 162B are second screen customizing information for generating a second display screen.

Here, the screen customizing information 162A is identical to the screen customizing information 142 stored in the local controller 140A, and the screen customizing information 142B is identical to the screen customizing information 142 stored in the local controller 140B. Note that, when there is no need to distinguish between the screen customizing information 162A and 162B, the screen customizing information 162A and 162B is referred to as screen customizing information 162.

In other words, it is assumed that the storage unit 161 of the remote controller 160 includes screen customizing information 162 for every correlated local controller 140.

The screen customizing information 162 has a similar configuration as that of the screen customizing information 142 illustrated in FIG. 8. However, it is assumed that the screen customizing information 162 is associated with the local controller identification information for identifying the corresponding local controller 140.

The correlated operation management information 163 is information for managing the operating state of the air conditioner 130 connected to the local controller 140 correlated with the remote controller 160.

FIG. 10 is a schematic diagram illustrating an example of the correlated operation management information 163.

The correlated operation management information 163 is information in a table format containing a local controller column 163a, an operating state column 163b, a temperature setting column 163c, and an operation mode column 163d, as illustrated in FIG. 10.

The local controller column 163a stores local controller identification information for identifying the local controller 140 correlated with the remote controller 160.

The operating state column 163b stores operating state information indicating whether or not the corresponding air conditioner 130 in operation.

The temperature setting column 163c stores temperature setting information indicating the temperature setting of the corresponding air conditioner 130.

The operation mode column 163d stores operation mode information indicating the operation mode of the corresponding air conditioner 130.

To return to FIG. 9, the remote communication unit 164 is connected to the second LAN 181 and communicates with the second LAN 181.

The display unit 165 displays a display screen as the second display screen. Note that the display screen displayed by the remote controller is also referred to as a remote display screen.

The input unit 166 accepts an input of an instruction from a user via a screen displayed on the display unit 165.

The remote control unit 167 controls the processing by the remote controller 160.

For example, the remote control unit 167 uses a screen displayed on the display unit 165 to accept, via the input unit 166, a selection of the air conditioner 130 to be controlled, or in other words, the air conditioner 130 to be switched. For example, the name of the air conditioner included in the screen customizing information 162 may be displayed, and the selection of the air conditioner 130 to be controlled may be accepted. The input of such selection corresponds to an input of a switching instruction.

The remote control unit 167 then causes the display unit 165 to display a display screen on the basis of the screen customizing information 162 and the correlated operation management information 163 corresponding to the selected air conditioner 130 and being stored in the storage unit 161, and controls the selected air conditioner 130 in accordance with the instruction accepted by the input unit 166. In other words, the display screen is switched to one corresponding to the air conditioner 130 to be controlled.

When the input unit 166 accepts an input instructing the setting for changing the display screen via the screen displayed on the display unit 165, the remote control unit 167 changes the associated screen customizing information 162 in response to the input instruction, and renews the timestamp with the time at which the change was made.

When the screen customizing information 162 is changed, the remote control unit 167 generates setting information or second setting information including the changed part, the timestamp indicating the time at which the change was made, and the associated local controller identification information. The remote control unit 167 then causes the remote communication unit 164 to send the setting information to the server 110. Note that the changed part includes the item names of the changed items and the content after the change.

The remote control unit 167 generates, in a predetermined cycle, local confirmation requests, which are requests for confirming whether or not the display screen of the correlated local controller 140 has been changed. A local confirmation request includes a timestamp included in the screen customizing information 162 and local controller identification information associated with the screen customizing information 162. The predetermined cycle is preferably from one minute to one hour. The remote control unit 167 then causes the remote communication unit 164 to send the local confirmation request to the server 110.

Then, when the remote communication unit 164 receives local renewal information or renewal information from the server 110 as a response to the local confirmation request, the remote control unit 167 renews the associated screen customizing information 162 stored in the storage unit 161 on the basis of the received local renewal information. Consequently, when the display screen displayed on the correlated local controller 140 is changed, the display screen displayed on the remote controller 160 is also changed to be identical to the display screen displayed in the local controller 140.

The remote control unit 167 generates, in a predetermined cycle, operation confirmation requests for confirming whether or not the operating state of the air conditioner 130 connected to the correlated local controller 140 has been changed. An operation confirmation request includes remote controller identification information for identifying the remote controller 160. The predetermined cycle is preferably from one second to 10 seconds. The remote control unit 167 then causes the remote communication unit 164 to send the operation confirmation request to the server 110.

Then, when the remote communication unit 164 receives operating state response information from the server 110 as a response to the operation confirmation request, the remote control unit 167 renews the corresponding information in the correlated operation management information 163 stored in the storage unit 161 on the basis of the received operating state response information.

A portion or the entirety of the remote control unit 167 described above can be implemented by, for example, a memory 10 and a processor 11, as illustrated in FIG. 6A. Such programs may be provided via a network or may be recorded and provided on a recording medium. That is, such programs may be provided as, for example, program products.

A portion or the entirety of the remote control unit 167 can also be implemented by, for example, a processing circuit 12, as illustrated in FIG. 6B.

Note that the storage unit 161 can be implemented by, for example, a non-volatile memory.

The remote communication unit 164 can be implemented by a communication device such as an NIC.

The display unit 165 and the input unit 166 can be implemented by, for example, a touch screen.

Figure 11:
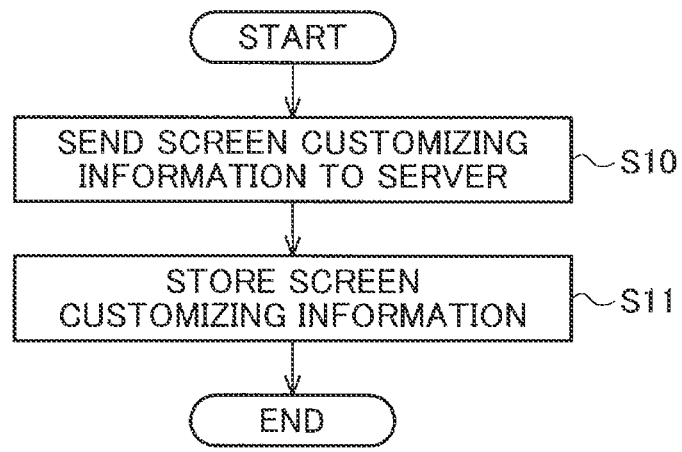
FIG. 11 is a flowchart illustrating the operation of a local controller sending screen customizing information to a server.

FIG. 11 is a flowchart illustrating the operation of a local controller 140 sending screen customizing information to the server 110.

The operation indicated in FIG. 11 should be performed once when the screen customizing information 142 is stored in the local controller 140 at the start of the use of the local controller 140, etc.

First, the local control unit 147 sends the screen customizing information 142 stored in the storage unit 141 together with local controller identification information to the server 110 via the local communication unit 143 (step S10). The screen customizing information 142 also includes files identified by file names indicated by the screen customizing information 142.

When the server communication unit 115 receives the screen customizing information 142 and the local controller identification information from the local control unit 147, the server control unit 118 changes the timestamp column 142c of the screen customizing information 142 so that timestamps can be stored in the respective rows and stores the timestamps stored in the timestamp column 142c in the respective rows, to generate screen customizing management information 113 #1 as illustrated in FIG. 4, and stores the generated screen customizing management information 113 #1 in the storage unit 111 as part of the screen management information 113 in association with the received local controller identification information (step S11).

Figure 12:
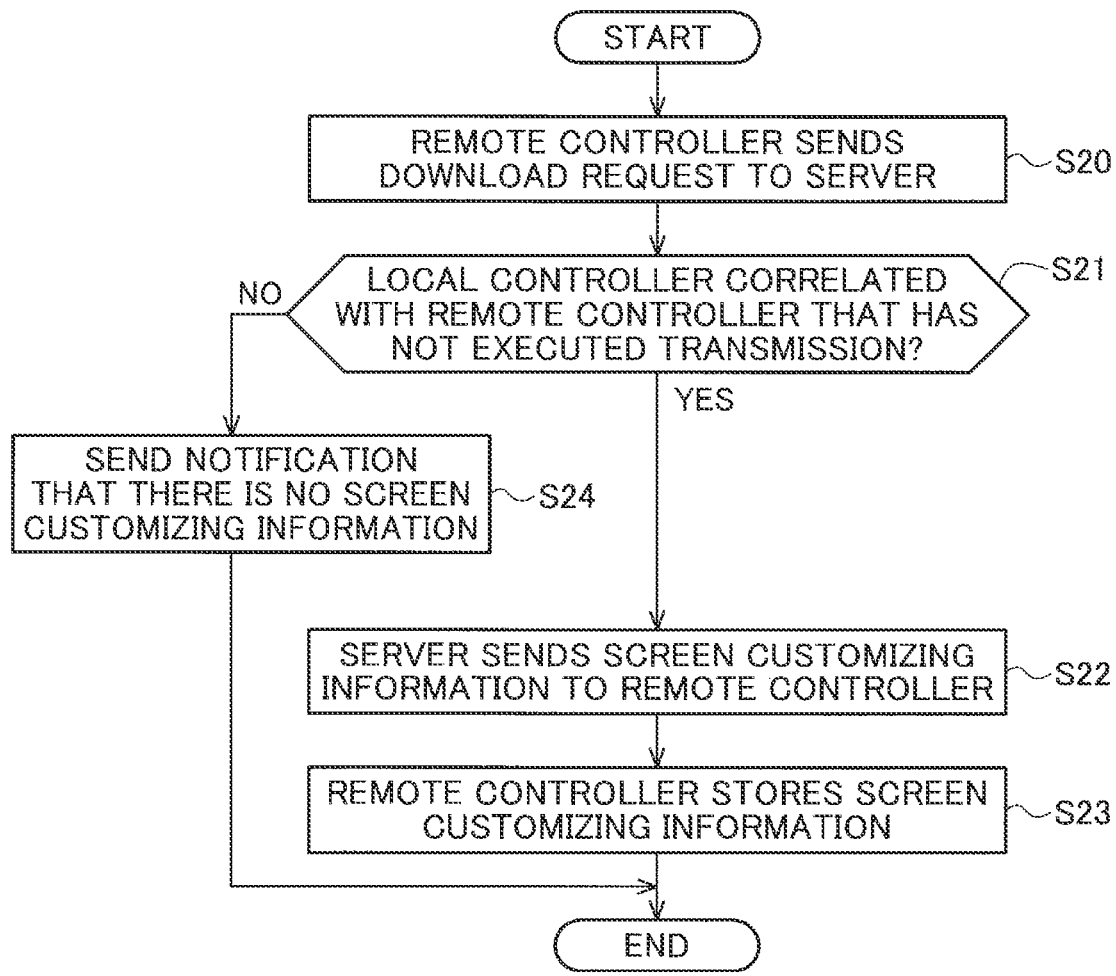
FIG. 12 is a flowchart illustrating the operation of a remote controller downloading screen customizing information of a correlated controller from a server.

FIG. 12 is a flowchart illustrating the operation of the remote controller 160 downloading screen customizing information of the correlated controller from the server 110.

The remote control unit 167 of the remote controller 160 generates a download request including remote controller identification information and causes the remote communication unit 164 to send the download request to the server 110 (step S20).

The server control unit 118 of the server 110 that has received the download request refers to the controller management information 112 to determine whether or not an of the local controllers 140 out of the local controllers 140 correlated with the remote controller identification information included in the download request has not transmitted screen customizing information (step S21). If there is such a local controller 140 (Yes in step S21), the process proceeds to step S22, and if there is no such local controller 140 (No in step S21), the process proceeds to step S24.

In step S22, the server control unit 118 refers to the controller management information 112 to specify a local controller 140 that has not transmitted screen customizing information out of the local controllers 140 correlated with the remote controller identification information included in the download request, and reads the screen customizing management information of the specified local controller 140 from the screen management information 113. The server control unit 118 then generates screen customizing information by changing the timestamp column of the read screen customizing management information so that all rows show the same timestamp. Moreover, the server control unit 118 causes the server communication unit 115 to send the generated screen customizing information together with the local controller identification information of the specified local controller 140 to the remote controller 160 that is the request source. The process then proceeds to step S23.

In step S23, the remote controller 160 that has received the screen customizing information and the local controller identification information associates the received screen customizing information with the received local controller identification information and stores the information in the storage unit 161.

In step S24, the server control unit 118 causes the server communication unit 115 to send information indicating that there is no associated screen customizing information to the remote controller 160 that is the request source.

Figure 13:
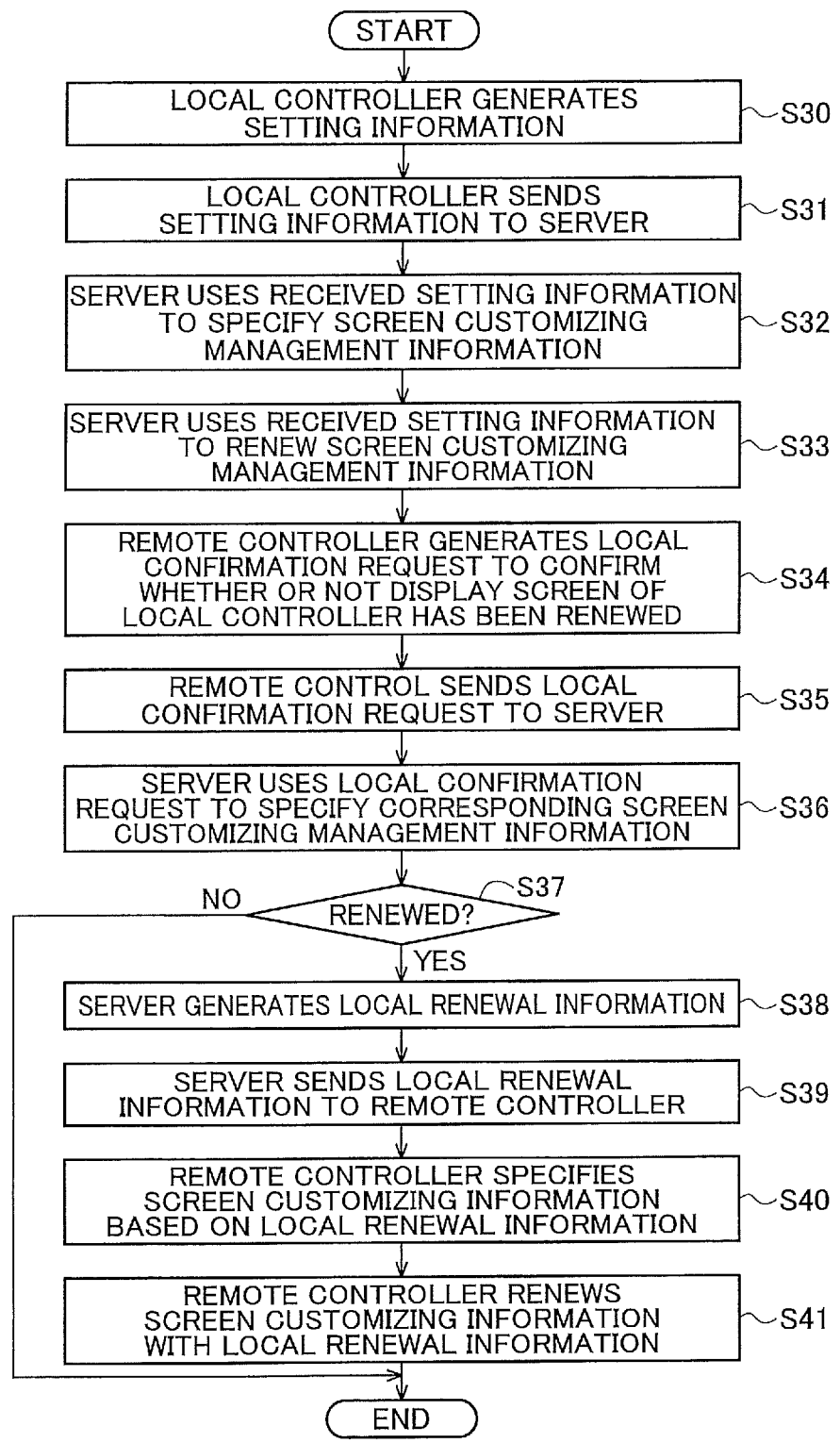
FIG. 13 is a flowchart illustrating the operation from the transmission of setting information by a local controller to the updating of screen customizing information by a remote controller.

FIG. 13 is a flowchart illustrating the operation from the transmission of the setting information by the local controller 140 to the updating of the screen customizing information 162 by the remote controller 160.

Note that the operation illustrated in FIG. 13 is started immediately after the user customizes the display of the local controller 140 and the local control unit 147 renews the screen customizing information 142.

The local control unit 147 of the local controller 140 extracts the item names and the content of the renewed row and the time tamp from the screen customizing information 142, and generates setting information by adding the local controller identification information of the local controller 140 (step S30).

Next, the local control unit 147 causes the local communication unit 143 to send the generated setting information to the server 110 (step S31).

The server control unit 118 of the server 110 that has received the setting information specifies, in the screen management information 113, the screen customizing management information associated with the local controller identification information included in the received setting information (step S32).

The server control unit 118 then renews the specified screen customizing management information with the received setting information (step S33). For example, in the screen customizing management information, the server control unit 118 renews the content of the row of the item name corresponding to the item name included in the setting information with the content included in the setting information, and renews the timestamp of the row with the timestamp included in the setting information.

Next, to confirm whether or not the display screen of the correlated local controller 140 has been changed, the remote control unit 167 of the remote controller 160 generates a local confirmation request including the timestamp included in the screen customizing information 162 stored in the storage unit 161 and the local controller identification information associated with the screen customizing information 162 (step S34). Here, when the remote controller 160 is correlated with multiple local controllers 140, the local confirmation request may include information about the multiple local controllers 140 or may include information about one local controller 140.

The remote control unit 167 then causes the remote communication unit 164 to send the local confirmation request to the server 110 (step S35).

Next, the server control unit 118 of the server 110 that has received the local confirmation request specifies, in the screen management information 113, the screen customizing management information associated with the local controller identification information included in the received local confirmation request (step S36).

The server control unit 118 then compares the timestamp stored in the timestamp column of the specified screen customizing management information with the timestamp included in the received local confirmation request to determine whether or not the display screen of the local controller 140 has been renewed (step S37). If the display screen has been renewed (Yes in step S37), the process proceeds to step S38, and if the display screen has not been renewed (No in step S37), the process ends.

In step S38, the server control unit 118 generates local renewal information including the item name, the content, the content, and the timestamp of the row renewed in the screen customizing management information, and local controller identification information associated with the screen customizing management information.

The server control unit 118 then causes the server communication unit 115 to send the local renewal information to the remote controller 160 that has sent the local confirmation request (step S39).

Next, the remote control unit 167 of the remote controller 160 that has received the local renewal information specifies, in the storage unit 161, the screen customizing information 162 associated with the local controller identification information included in the received local renewal information (step S40).

The remote control unit 167 then, in the specified screen customizing information 162, renews the content of the column corresponding to the item name included in the received local renewal information with the content included in the received local renewal information, and also renews the timestamp column with the timestamp included in the received local renewal information (step S41).

Note that, when the screen customizing information 162 corresponding to the display screen displayed on the display unit 165 is renewed, the remote control unit 167 generates a display screen with the renewed content and causes the display unit 165 to display the display screen.

Consequently, the remote controller 160 can renew the display screen displayed on the display unit 165 in accordance with the renewal of the display screen of the correlated local controller 140.

Figure 14:
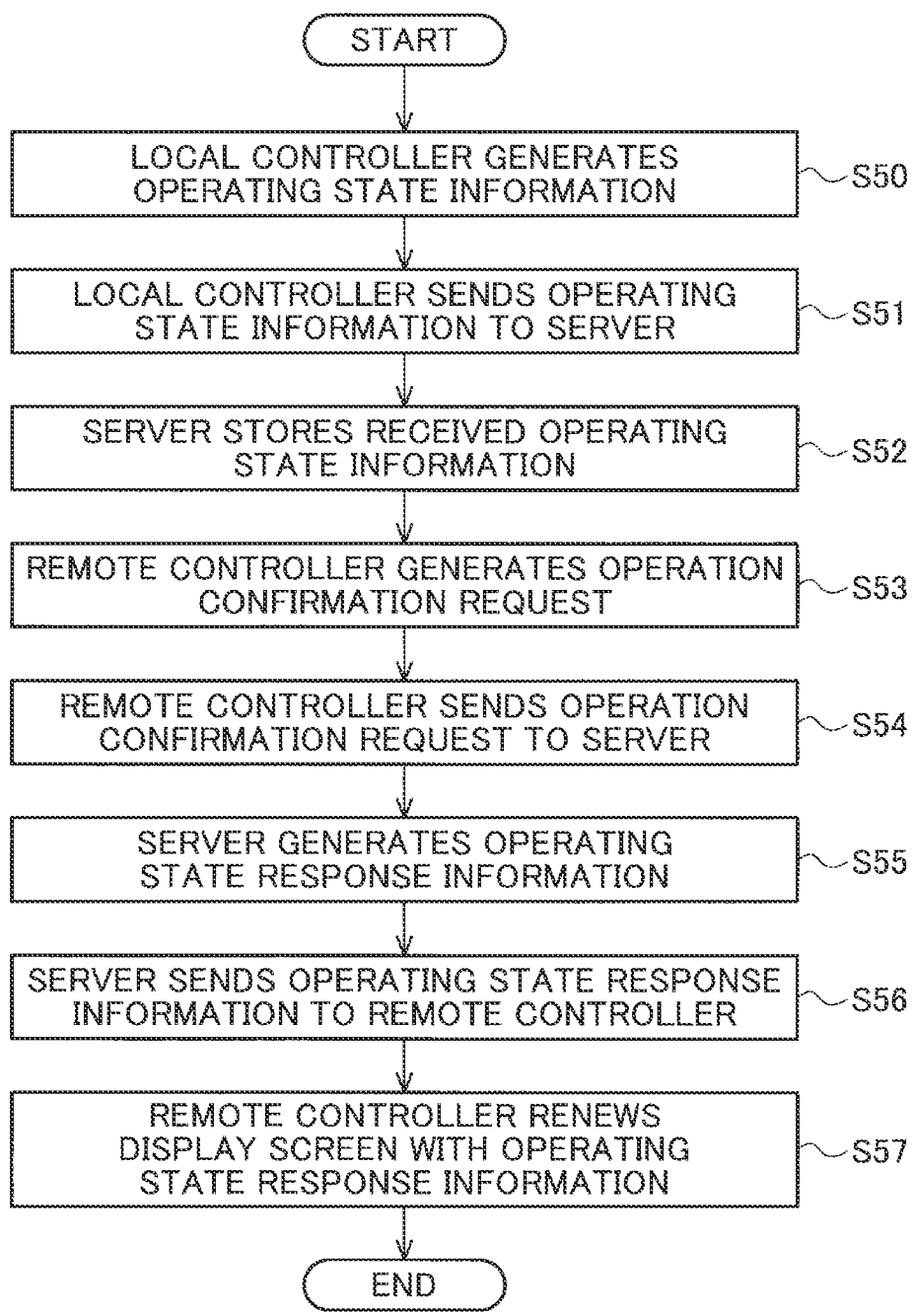
FIG. 14 is a flowchart illustrating the operation from the transmission of operating state information by a local controller to the updating of correlated operation management information by a remote controller.

FIG. 14 is a flowchart illustrating the operation from the sending of operating state information by the local controller 140 to the updating of correlated operation management information 163 by the remote controller 160.

Note that the operation illustrated in FIG. 14 is performed periodically.

The local control unit 147 of the local controller 140 generates operating state information including information indicating the operating state of the connected air conditioner 130 and local controller identification information (step S50).

Next, the local control unit 147 causes the local communication unit 143 to send the generated operating state information to the server 110 (step S51).

The server control unit 118 of the server 110 that has received the operating state information specifies the row corresponding to the local controller identification information included in the received operating state information in the operation management information 114, and renews the information stored in the row with the corresponding information included in the received operating state information (step S52).

Next, to confirm the operating state of the correlated local controller 140, the remote control unit 167 of the remote controller 160 generates an operation confirmation request including the local controller identification information stored in the correlated operation management information 163 stored in the storage unit 161 (step S53). Here, when the remote controller 160 is correlated with multiple local controllers 140, the operation confirmation request may include local controller identification information of the multiple local controllers 140 or may include local controller identification information of one local controller 140.

The remote control unit 167 then causes the remote communication unit 164 to send the operation confirmation request to the server 110 (step S54).

Next, the server control unit 118 of the server 110 that has received the operation confirmation request specifies the operating state from the row corresponding to the local controller identification information included in the received operation confirmation request in the operation management information 114, and generates operating state response information including the specified operating state information and the corresponding local controller identification information (step S55).

The server control unit 118 then causes the server communication unit 115 to send the operating state response information to the remote controller 160 that has sent the operation confirmation request (step S56).

Next, the remote control unit 167 of the remote controller 160 that has received the operating state response information renews, in the storage unit 161, the information in the row corresponding to the local controller identification information included in the received operating state response information with the corresponding information included in the operating state response information (step S57).

Note that when the information in the row corresponding to the display screen displayed on the display unit 165 is renewed, the remote control unit 167 generates a display screen with the renewed information and causes the display unit 165 to display the display screen.

Consequently, the remote controller 160 can cause the latest operating state of the correlated local controller 140 to appear on the display screen.

Figure 15:
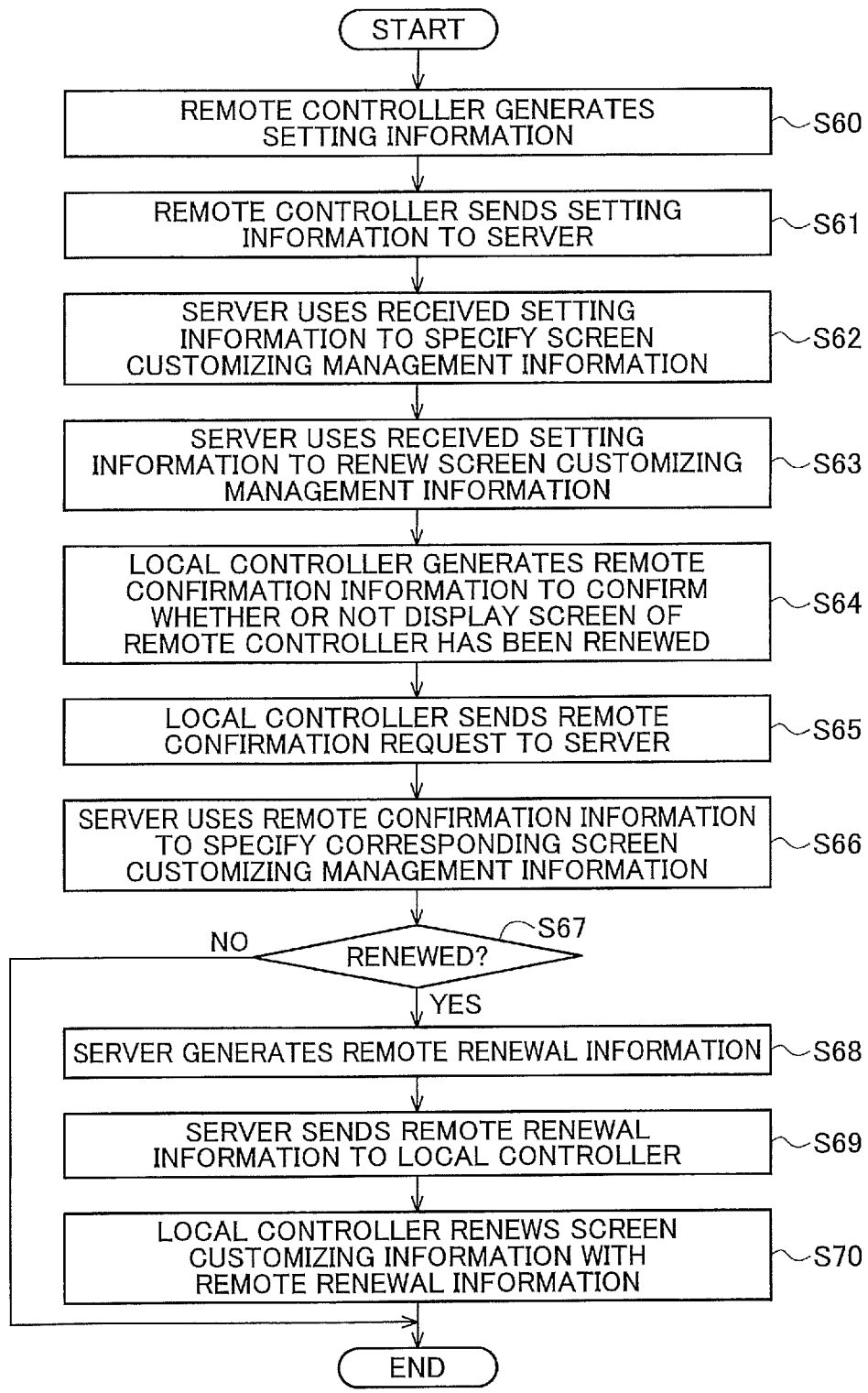
FIG. 15 is a flowchart illustrating the operation from the transmission of setting information by a remote controller to the updating of screen customizing information by a local controller.

FIG. 15 is a flowchart illustrating the operation from the transmission of the setting information by the remote controller 160 to the updating of the screen customizing information 142 by the local controller 140.

Note that the operation illustrated in FIG. 15 starts immediately after the user customizes the display screen of the remote controller 160 and the remote control unit 167 renews the screen customizing information 162.

The remote control unit 167 of the remote controller 160 extracts the item name and the content of the renewed row and the timestamp from the screen customizing information 162, and generates setting information by adding the local controller identification information associated with the screen customizing information 162 (step S60).

Next, the remote control unit 167 causes the remote communication unit 164 to send the generated setting information to the server 110 (step S61).

The server control unit 118 of the server 110 that has received the setting information specifies, in the screen management information 113, the screen customizing management information associated with the local controller identification information included in the received setting information (step S62).

The server control unit 118 then renews the specified screen customizing management information with the received setting information (step S63). For example, in the screen customizing management information, the server control unit 118 renews the content of the row of the item name corresponding to the item name included in the setting information with the content included in the setting information, and renews the timestamp of the row with the timestamp included in the setting information.

Next, to confirm whether or not the display screen of the correlated remote controller 160 has been changed, the local control unit 147 of the local controller 140 generates a remote confirmation request including the timestamp included in the screen customizing information 142 stored in the storage unit 141 and local controller identification information (step S64).

The local control unit 147 then causes the local communication unit 143 to send the remote confirmation request to the server 110 (step S65).

Next, the server control unit 118 of the server 110 that has received the remote confirmation request then specifies, in the screen management information 113, the screen customizing management information associated with the local controller identification information included in the received remote confirmation request (step S66).

The server control unit 118 then compares the timestamp stored in the timestamp column of the specified screen customizing management information with the timestamp included in the received remote confirmation request to determine whether or not the display screen of the remote controller 160 has been renewed (step S67). If the display screen has been renewed (Yes in step S67), the process proceeds to step S68, and if the display screen has not been renewed (No in step S67), the process ends.

In step S68, the server control unit 118 generates remote renewal information including the item name, the content, and the timestamp of the renewed row in the screen customizing management information.

The server control unit 118 then causes the server communication unit 115 to send the remote renewal information to the local controller 140 that has sent the remote confirmation request (step S69).

Next, the local control unit 147 of the local controller 140 that has received the remote renewal information renews, in the screen customizing information 162 stored in the storage unit 141, the content of the column corresponding to the item name included in the received remote renewal information with the content included in the received remote renewal information and also renews the timestamp column with the timestamp included in the received remote renewal information (step S70).

Note that, when the display screen is displayed on the display unit 145, the local control unit 147 generates a display screen with the renewed content and causes the display unit 145 to display the display screen.

Consequently, the local controller 140 can renew the display screen displayed on the display unit 145 in accordance with the renewal of the display screen of the correlated remote controller 160.

Figure 16:
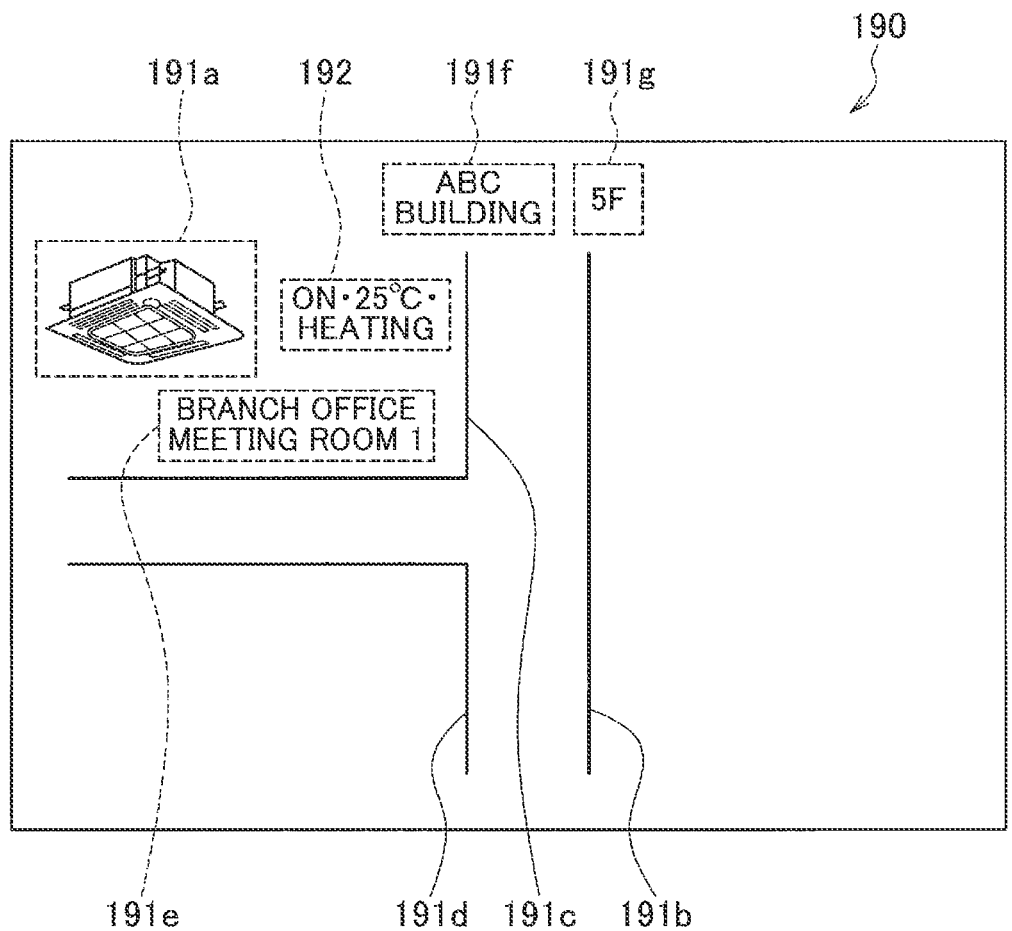
FIG. 16 is a diagram illustrating an example of a display screen displayed on a local controller and a remote controller.

FIG. 16 is a diagram illustrating an example of a display screen displayed on the local controller 140 and the remote controller 160.

The display screen 190 illustrated in FIG. 16 is displayed on the basis of the screen customizing information 142 illustrated in FIG. 8.

The entire display screen 190 is displayed in a bitmap format as the floor image indicated in FIG. 8.

An object 191a of the air conditioner and lines 191b, 191c, and 191d representing the layout of a room are drawn in the floor layout indicated in FIG. 8.

Moreover, the name 191e of the air conditioner, the building name 191f, and the floor name 191g are drawn by determining the coordinates thereof in the floor layout indicated in FIG. 8 in accordance with the name of the air conditioner indicated in FIG. 8, the name of the building indicated in FIG. 8, and the floor name indicated in FIG. 8, respectively.

Note that the operating state 192 of the air conditioner is displayed in accordance with the operating state of the air conditioner 130.

In the embodiments described above, the local controller 140 and the remote controller 160 are described as separate components, but it is preferable that a installed controller be identified either as the local controller 140 or the remote controller 160 in the stage of installation in the air conditioning management system 100, where the controller includes, for example, a connection interface unit functioning as the air conditioning communication unit 144, a communication interface unit functioning as the local communication unit 143 or the remote communication unit 164, a display unit functioning as the display unit 145 or the display unit 165, an input unit functioning as the input unit 146 or the input unit 166, a storage unit functioning as the storage unit 141 or the storage unit 161, and a control unit functioning as the local control unit 147 or the remote control unit 167.

For example, when such a controller is connected to the air conditioner 130, the controller may function as the local controller 140, and when the controller is not connected to the air conditioner 130, the controller may function as the remote controller 160. Alternatively, the identification of the local controller 140 and the remote controller 160 may be inputted via the input unit.

According to the embodiments described above, the customization of the display screen performed at the local controller 140 can be automatically reflected to the display screen of the remote controller 160, and the customization of the display screen performed at the remote controller 160 can be automatically reflected to the display screen of the local controller 140.

Note that, by allowing controllers having the same configuration to be used as the local controllers 140 and the remote controllers 160, the local controllers 140 and the remote controllers 160 do not have to be provided separately depending on the configuration of the air conditioning management system 100, and costs can be reduced through mass production.

When the remote controller 160 is correlated with multiple local controllers 140, the remote controller can switch between and multiple display screens identical to the multiple display screens of the multiple local controllers 140, and thus the remote controller 160 can control the air conditioner 130 by using the same display screens as those of the local controllers 140.

The local controller 140 sends operating state information indicating the operating state of the air conditioner 130 to the server 110, and the remote controller 160 receives the operating state response information indicating the operating state of the air conditioner 130 from the server 110, and thereby the remote controller 160 can display the operating state of the air conditioner 130.

What is claimed is:

1. A controller to select and execute one of first air conditioning control and second air conditioning control, the controller comprising:
   a connection interface unit to be connected to an air conditioner;
   a communication interface unit to perform communication;
   a display unit to display a display screen; and
   processing circuitry to control the connection interface unit, the communication interface unit, and the display unit; wherein
   in a case where the first air conditioning control is executed,
      the connection interface unit is connected to the air conditioner,
      the communication interface unit is connected to a first network,
      the processing circuitry is configured to
         cause the display unit to display a first display screen in accordance with first screen customizing information for generating the first display screen for controlling the air conditioner, and control the air conditioner by using the first display screen,
         in response to the first screen customizing information being changed in order to change the first display screen, send first setting information from the communication interface unit to a server connected to the Internet via a first firewall connected to the first network, the first setting information indicating a changed part of the first screen customizing information,
         transmit, to the server via the communication interface unit, a request for renewal information, and
         in response to receipt, from the server via the communication interface unit, of renewal information indicating a changed part of screen customizing information for generating a remote display screen, change, by changing the first screen customizing information in accordance with the received renewal information, the first display screen so that the first display screen is to be identical to the remote display screen, the remote display screen being a display screen to be displayed in a remote controller not connected to the air conditioner; and
   in a case where the second air conditioning control is executed,
      the connection interface unit is not connected to the air conditioner,
      the communication interface unit is connected to a second network,
      the processing circuitry is configured to
         cause the display unit to display a second display screen for controlling the air conditioner in accordance with second screen customizing information for generating the second display screen,
         in response to the second screen customizing information being changed in order to change the second display screen, send second setting information indicating a changed part of the second screen customizing information from the communication interface unit to the server connected to the Internet via a second firewall connected to the second network,
         transmit, to the server via the communication interface unit, a request for renewal information, and
         in response to receipt, from the server via the communication interface unit, of renewal information indicating a changed part of screen customizing information for generating a local display screen, change, by changing the second screen customizing information in accordance with the received renewal information, the second display screen so that the second display screen is to be identical to the local display screen, the local display screen being a display screen to be displayed in a local controller directly connected to the air conditioner.

2. The controller according to claim 1, wherein the processing circuitry is configured to
   in response to the connection interface unit being connected to the air conditioner, execute the first air conditioning control, and
   in response to the connection interface unit not being connected to the air conditioner, execute the second air conditioning control.

3. The controller according to claim 2, further comprising:
   a storage unit, wherein
   the processing circuitry is configured to
      store, in the storage unit, the first screen customizing information in response to the first air conditioning control being executed and store the second screen customizing information in response to the second air conditioning control being executed.

4. The controller according to claim 3, further comprising:
   an input unit, wherein
   the processing circuitry is configured to
      in a case where the controller executes the second air conditioning control, and the first network is connected to a plurality of the local controllers, store, in the storage unit, multiple pieces of the second screen customizing information that are identical to multiple pieces of the screen customizing information of the local controllers, and in response to receipt of a switching instruction for the second display screen being input to the input unit, the switch between a plurality of the second display screens to be displayed on the display unit by switching between the pieces of the second screen customizing information in accordance with the switching instruction.

5. The controller according to claim 1, further comprising:
   a storage unit,
   wherein the processing circuitry is configured to
      store, in the storage unit, the first screen customizing information according to the first air conditioning control being executed and the second screen customizing information according to the second air conditioning control being executed.

6. The controller according to claim 5, further comprising:
   an input unit,
   wherein the processing circuitry is configured to
      in a case where the controller executes the second air conditioning control, and the first network is connected to a plurality of the local controllers, store, in the storage unit, multiple pieces of the second screen customizing information that are identical to multiple pieces of the screen customizing information of the local controllers, and in response to receipt of a switching instruction for the second display screen being input to the input unit, switch between a plurality of the second display screens to be displayed on the display unit by switching between the pieces of the second screen customizing information in accordance with the switching instruction.

7. The controller according to claim 1, wherein the processing circuitry is configured to
in a case where the controller is executing the first air conditioning control,
send operating state information indicating an operating state of the air conditioner to the server via the communication interface unit.

8. The controller according to claim 1, wherein the processing circuitry is configured to
in a case where the controller is executing the second air conditioning control,
obtain operating state response information indicating an operating state of the air conditioner from the server via the communication interface unit and make the second display screen include information indicating the operating state.

9. An air conditioning system comprising:
a first controller to control an air conditioner, the first controller being to be connected to the air conditioner and a first network and being able to communicate with the Internet via a first firewall connected to the first network;
a second controller to control the air conditioner via the first controller, the second controller being to be connected to a second network and being able to communicate with the Internet via a second firewall connected to the second network; and
a server to be connected to the Internet; wherein
the first controller comprises:
a connection interface unit to be connected to the air conditioner,
a first communication interface unit to be connected to the first network, and
first processing circuitry configured to
display, on a first display unit, a first display screen based on first screen customizing information, the first screen customizing information being information for generating the first display screen, and
send, in response to the first screen customizing information being changed in order to change the first display screen, first setting information indicating a changed part of the first screen customizing information to the server via the first communication interface unit,
the second controller comprises:
a second communication interface unit to be connected to the second network, and
second processing circuitry configured to
display, on a second display unit, a second display screen based on second screen customizing information identical to the first screen customizing information, the second screen customizing information being information for generating the second display screen identical to the first display screen, and
send, in response to the second screen customizing information being changed in order to change the second display screen, second setting information indicating a changed part of the second screen customizing information to the server via the second communication interface unit, and
the server comprises:
a server communication interface unit to be connected to the Internet, and
server processing circuitry configured to
send first renewal information identical to the second setting information to the first controller via the server communication interface unit in response to a request from the first controller, and
send second renewal information identical to the first setting information to the second controller via the server communication interface unit in response to a request from the second controller, wherein
the first processing circuitry is further configured to
transmit, to the server via the first communication interface unit, a request for first renewal information, and
in response to receipt of the first renewal information from the server via the first communication interface unit, change, by changing the first screen customizing information in accordance with the first renewal information, the first display screen so that the first display screen is to be identical to the changed second display screen, and
the second processing circuitry is further configured to
transmit, to the server via the second communication interface unit, a request for second renewal information, and
in response to receipt of the second renewal information from the server via the second communication interface unit, change, by changing the second screen customizing information in accordance with the second renewal information, the second display screen so that the second display screen is to be identical to the changed first display screen.

* * * * *